United States Patent [11] 3,594,932

[72] Inventor Henning Emanuel Eriksson
 10 Furumostigen, S-952 00 Kalix, Sweden
[21] Appl. No. 800,996
[22] Filed Feb. 20, 1969
[45] Patented July 27, 1971
[32] Priority Oct. 7, 1968
[33] Sweden
[31] 13480/1968

[54] COMBINED SNOW PLOW AND GARDEN CART
 1 Claim, 8 Drawing Figs.
[52] U.S. Cl. ................................................. 37/53,
 37/130, 37/123, 280/47.26, 280/47.21, 298/2
[51] Int. Cl. ........................................... E01h 5/02,
 B62b 1/24
[50] Field of Search ......................................... 37/123,
 130, 53, 16; 280/47.26, 47.21, 47.24, 47.18;
 298/2, 5, 6, 9; 294/51, 53.5, 54, 55

[56] References Cited
 UNITED STATES PATENTS
 898,204  9/1908  Feller .......................... 298/2
 1,298,126  3/1919  Vessey ......................... 37/130
 1,683,732  9/1928  Selin ............................ 37/130
 1,797,471  3/1931  Jones ........................... 298/2
 2,297,344  9/1942  Beall ............................ 298/2
 2,320,387  6/1943  Schroeder .................... 37/130
 2,664,310  12/1953  Mueller et al. ............... 298/2
 3,028,695  4/1962  Westby ......................... 37/130
 3,248,811  5/1966  Pravednekow ................ 37/130
 3,475,838  11/1969  Hagen et al. .................. 37/123 X Primary Examiner—Robert E. Pulfrey
Assistant Examiner—Clifford D. Crowder
Attorney—Richards and Geier ABSTRACT: A combined snow plow and garden cart has holders swingably fixed to the plow and a locking device to lock the plow to the holders. The two sides of the plow are provided with separate arms swingable in a vertical plane, the ends of the arms opposed to their axle carrying wheels for rolling the plow and cart. The swinging movements of the arms take place between two positions. In the first position the front bottom portion of the plow extends substantially parallel to the ground and lies against the ground. In the second position the front bottom portion is located at a substantial distance from the ground, the distance being preferably approximately equal to the distance of the wheel axis from the ground.

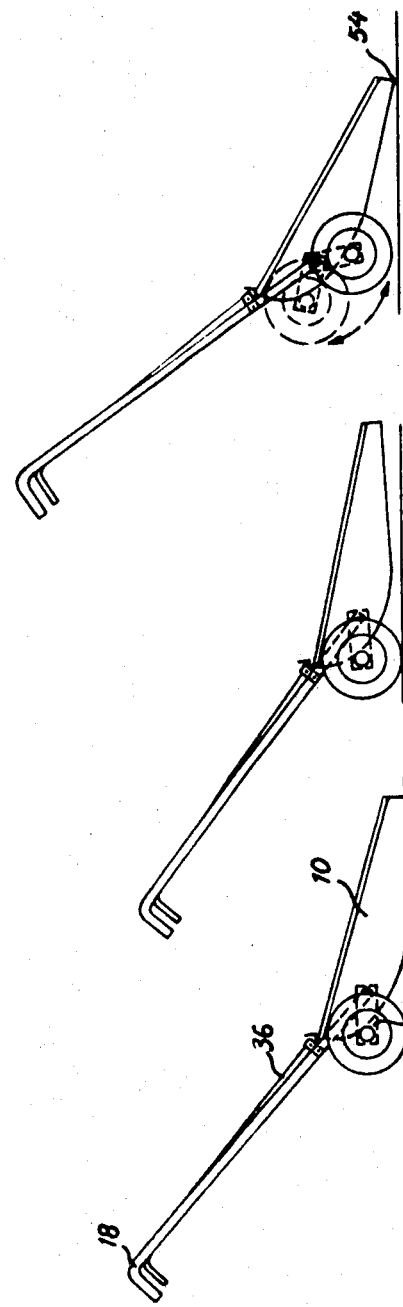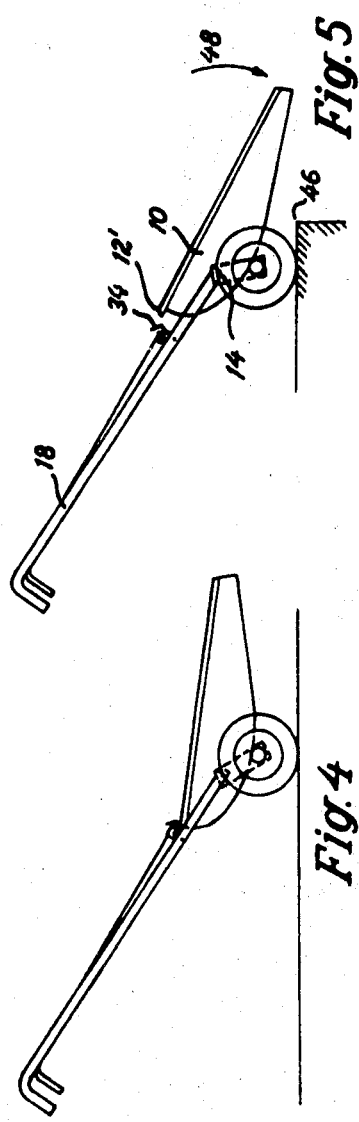

INVENTOR
HENNING EMANUEL ERIKSSON
Richards & Geier
ATTORNEYS

COMBINED SNOW PLOW AND GARDEN CART

This invention relates to a combined snow plow and garden cart of the type wherein the plow is provided with swingable holders which may be locked to the plow.

An object of the present invention is to provide a snow plow which can be also used for transporting purposes during warm weather, for example, for the removal of leaves and other light things. A plow of this type must be able to slide over snow-covered ground and also to roll over ground having no snow.

Other objects of the present invention will become apparent in the course of the following specification.

In the accomplishment of the objectives of the present invention it was found advisable to provide a combined snow plow and garden cart of the described type wherein the plow is provided with swingable arms carrying wheels for rolling the plow serving as a cart. The arms can be locked in two positions in one of which the plow lies upon the ground.

The invention will appear more clearly from the following detailed description when taken in connection with the accompanying drawings, showing, by way of example only, a preferred embodiment of the inventive idea.

In the drawings:

FIG. 1 is a side view of the combined snow plow and garden cart of the present invention wherein the plow lies upon the ground;

FIG. 2 is similar to FIG. 1, but shows the plow as being slightly raised, so that it can be rolled over the ground;

FIG. 3 is similar to FIGS. 1 and 2, but shows the plow when swung over its front edge with the wheels being swung downwardly;

FIG. 4 is similar to FIGS. 1, 2 and 3, but shows the plow as resting upon downwardly clamped springs, the plow being located at a substantially high distance from the ground;

FIG. 5 is similar to FIGS. 1, 2, 3 and 4, but shows the plow as being freed from the holders for tipping;

Figure 8:
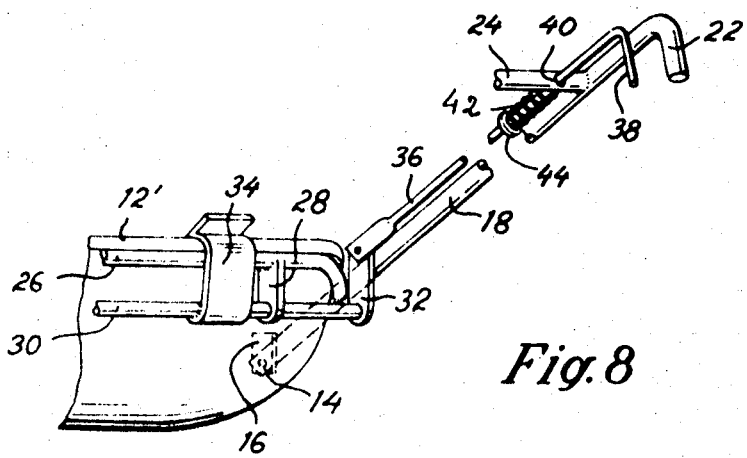
FIG. 8 is a perspective view showing the device for holding the plow.

The combined snow plow and garden cart shown in the drawings has a plow shaped as a container 10 the top side and rear edges of which are provided with a strengthening rim 12. The front of the container-shaped plow is open so that in the position shown in FIG. 1 it can receive snow by being pushed slidingly upon the ground against the snow as a type of spade. A pivot 14 extends through the sides of the plow 10 close to the rear and bottom ends thereof and is fixed by strengthening metal sheets 16 (FIG. 8). The pivot 14 carries holders 18 and wheel carrying arms 20. The two holders 18 of the plow are bent at their upper ends to form handles 22. The two holders 18 are also interconnected at their upper ends by a transverse rod 24 and at their lower ends by a transverse rod 26. The rod 26 is preferably U-shaped and is so arranged that its yoke part lies against the rear strengthening rim 12' of the plow. Two brackets 28 are rigidly fixed to the lower rod 26 close to the two ends thereof; they extend downwardly and form a bearing for a rotary shaft 30 which extends parallel to the rear edge of the plow and the transverse rod 26. An outer end of the shaft 30 carries an arm 32 and a hook 34 which are firmly fixed thereon. The outer end of the hook 34 is hooked over the rim portion 12' of the plow so as to lock the plow in the position shown in FIGS. 1—4. The plow 10 can be unhooked by swinging the hook 34 and removing it from the plow rim 12', whereupon the plow 10 will swing forward by its own weight, as shown in FIG. 5. The swinging of the hook 34 is made possible by a pivotal connection of the arm 32 with a rod 36. The rod 36 extends substantially parallel to a holder 18, which is the right-hand holder in the illustrated example. The rod 36 has a bent outer end similar to those of the holders, the bent end 38 of the rod 36 constituting a handle which extends parallel to the handle 22 of the holder 18. Thus the user can easily grasp the two handles 38 and 22 with one hand and pull the handle 38 relatively to the handle 22 when the plow is to be unhooked.

To provide good guiding for the rod 36 parallel to the holder 18, the upper transverse rod 24 is provided with a bore hole 40 close to the holder 18, the rod 36 extending through this bore hole. To prevent accidental opening of the lock by percussions or pushing of the plow, a coiled spring 42 is placed around the rod 36, one end of the spring engaging the transverse rod 24, while the other end of the spring is fixed to a flange 44 which is fixed upon the rod 36. Thus the spring 42 has the tendency to keep the hook 34 in the position shown in FIG. 8, wherein the plow 12 with its top rear rim 12' is pressed against the transverse rod 26. Only by pulling back the handle 38 against the force of the spring 42, it is possible to unhook the plow 10, so that the plow will be swung about its axle 14, as shown in FIG. 5. If, for example, the plow is brought to the edge of a trench, as indicated by the numeral 46 in FIG. 5, the contents of the container-shaped plow can be emptied by swinging the plow in the direction of the arrow 48 into a substantially vertical position, while the holders 18 remain in the position shown in FIG. 5.

Figure 6:
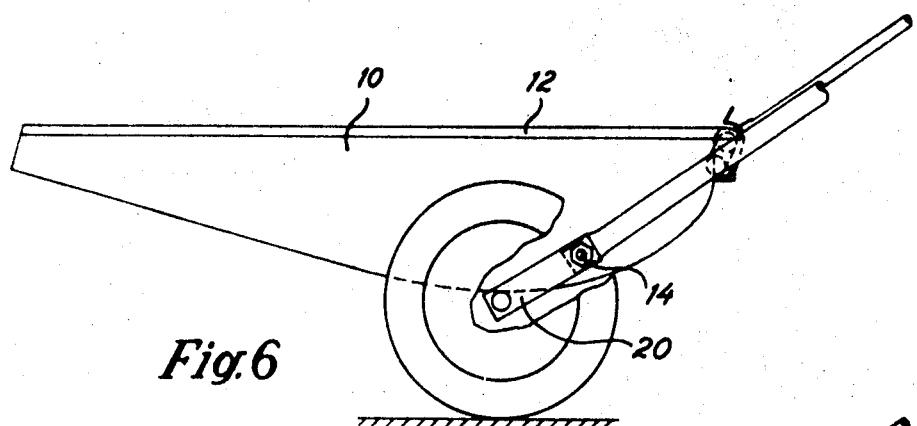
FIG. 6 is a side view of the combined snow plow and garden cart on a larger scale and shows the wheels in a downwardly swung position.
Figure 7:
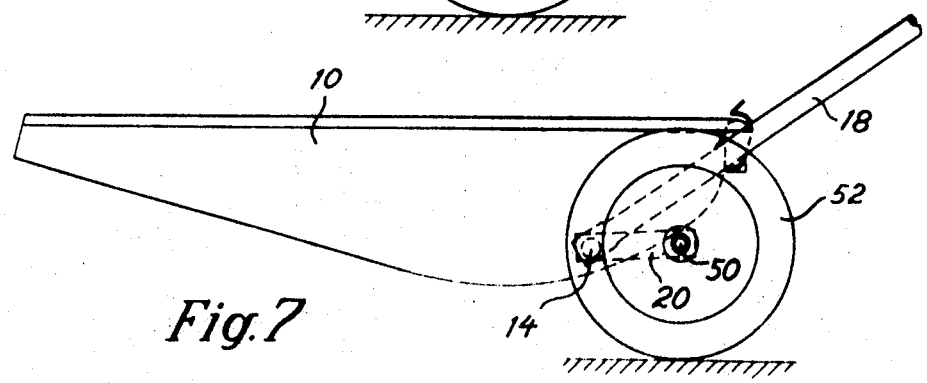
FIG. 7 is similar to FIG. 6, but shows the wheels in an upwardly swung position.

The above-mentioned arms 20 swingable about the pivot 14 carry upon their outer ends an axle 50 extending between the arms and carrying upon its opposite ends two wheels 52. Thus the arms 20 and the axle 50 form essentially a U-shaped body the yoke portion of which is constituted by the axle 50. In its two end positions shown in FIGS. 6 and 7 the axle 50 engages the bottom of the plow 10 and is held in these positions by the weight of the plow. If it is desired to move the wheels 52 to a position which is between these two end positions, the plow is raised by swinging it about its front edge 54, as shown in FIG. 3, whereupon the wheels with the two arms 20 and the axle 50 can be swung upwardly or downwardly. Then the front bottom portion of the plow 10 will be located either very close to the ground and parallel thereto, which is advantageous for snow removal, or it will be located at a comparatively high distance from the ground, as shown in FIG. 4, to serve as a light and convenient garden cart. This distance is approximately equal to the distance of the shaft 50 from the ground. In this position, with the wheels swung downwardly and forwardly (FIG. 4), the center of gravity of the containerlike plow lies approximately above the wheel axle 50. On the other hand, when removing snow (FIG. 1), the center of gravity lies in front of the wheel axle 50. This is most advantageous when the snow plow is slid along the ground for receiving the snow.

I claim:

1. A combined snow plow and garden cart, comprising a plow having the shape of a container open at the front and the top and having a bottom, the sidewalls of the container each being provided with a pivot, said pivots being on a common axis extending through the container, two vertically swingable arms carried by said pivots outside of said container, an axle carried by said arms, wheels carried by opposite ends of said axle, said arms being swingable from a position in which said axle abuts the bottom of the container in front of the pivots to a position in which said axle abuts the bottom of the container behind the pivots, two holders carried by said pivots, said holders being swingable independently of said swingable arms, and means for locking said container with said holders.